United States Patent [19]

Benaroya

[11] Patent Number: 4,572,403

[45] Date of Patent: Feb. 25, 1986

[54] TIMED DISPENSING DEVICE FOR TABLETS, CAPSULES, AND THE LIKE

[76] Inventor: Rafael Benaroya, 226 Early St., Park Forest, Ill. 60466

[21] Appl. No.: 575,824

[22] Filed: Feb. 1, 1984

[51] Int. Cl.[4] ........................ B65D 83/04; G06F 15/42

[52] U.S. Cl. ........................................... 221/3; 221/15; 221/76; 221/197; 364/479

[58] Field of Search ..................... 221/2, 3, 5, 7, 8, 15, 221/76, 82, 83, 197; 364/479

[56] References Cited

U.S. PATENT DOCUMENTS

| | | | |
|---|---|---|---|
| 3,369,697 | 2/1968 | Glucksman et al. | 221/9 |
| 3,744,672 | 7/1973 | Dangles et al. | 221/82 |
| 3,871,156 | 3/1975 | Koenig et al. | 53/59 R |
| 3,994,420 | 11/1976 | Harper et al. | 222/57 |
| 4,047,635 | 9/1977 | Bennett | 221/5 |
| 4,207,992 | 6/1980 | Brown | 221/15 |
| 4,310,103 | 1/1982 | Reilly et al. | 221/15 |
| 4,360,125 | 11/1982 | Martindale et al. | 221/15 X |
| 4,473,884 | 9/1984 | Behl | 221/2 X |

*Primary Examiner*—F. J. Bartuska

*Attorney, Agent, or Firm*—Fitch, Even, Tabin & Flannery

[57] ABSTRACT

A dispensing system is provided for timed dispensing of tablets, capsules and the like, the system comprising a base unit having a top cover and bottom cover, a carousel in the base unit, and a tray including bins for receiving tablets, capsules and the like. The dispensing system further includes a processor which actuates a drive operable to move the carousel, the processor accepting input information, causing visual and sound alarms, and providing output information for programming a plurality of alarm times with daily repeat feature.

18 Claims, 20 Drawing Figures

MICROCOMPUTER BLOCK DIAGRAM

TIMER TASK

ALARM TASK

LOW BATTERY TASK

MICRO SWITCH TASK

PUSHBUTTON TASK

KEYPAD TASK

SPEAKER TASK

TIMED DISPENSING DEVICE FOR TABLETS, CAPSULES, AND THE LIKE

BACKGROUND OF THE INVENTION

This invention relates generally to an apparatus and method for dispensing doses of tablets and capsules, and the like, and more particularly, it relates to apparatus and method for dispensing doses of tablets and capsules, and the like, in a timed manner.

Frequently, people are required to take medicines or vitamins on a timed basis, as for example birth control pills, and often are required to take multiple kinds of medicines and/or vitamins which are provided in the form of tablets or capsules. Often, a person forgets to take the tablets and/or capsules that are prescribed or may make a wrong selection of the medicines or vitamins. On the other hand, a person may absentmindedly retake a dose, resulting in an overdose. There is a recognized need for providing medicines and vitamins, or the like, on a regularized basis with timed notice to the person requiring them.

Heretofore, various dispensers for tablets or capsules have been provided, but these previously known dispensers have not served to adequately make the person aware of the timing of the dosages while providing immediate access to the medicines or vitamins at the specified times. Further, many of the heretofore known dispensers have not been available in such size as to be readily handleable by the person and have been generally large-sized. Various dispensers, as for example that shown in U.S. Pat. No. 3,871,156, are designed for use in connection with packaging of medicament pellets, but are not designed for patient use. U.S. Pat. No. 3,994,420 discloses a tablet dispensing mechanism, but it requires a jet of water to operate the mechanism and is obviously not adapted for ready availability to a patient. A programmed medication dipenser is disclosed in U.S. Pat. No. 3,369,697, the dispenser requiring a medicament container to interact with the dispenser to deactivate and reactivate the dispenser's motor means.

The heretofore known dispensers have not functioned to advise a person at the time for taking tablets or capsules, and functioned to provide available capsules or tablets in a prescribed number and kind. Further, the heretofore known dispensers have not provided tablets or capsules over extended periods of time with the automatic provision of the prescribed tablets or capsules with signalling at extended but timed periods.

OBJECTS OF THE INVENTION

It is a principal object of this invention to provide an improved capsule and tablet dispensing apparatus and method for providing doses at set and pre-determined periods of time.

It is a further object of this invention to provide an improved method and apparatus for dispensing capsules and/or tablets in pre-determined kinds and amounts at set periods with signalling at such periods.

It is a still further object of this invention to provide dispensing apparatus for tablets and capsules which functions to provide a person with notice of the time for medication or the taking of tablets or capsules.

Another object of this invention is to provide an improved system for dispensing tablets or capsules in pre-determined amounts at set periods of time with a reminder system for the taking of the dosages.

Still another object of the invention is to provide an improved capsule and tablet dispensing apparatus and method which reduces the risk of accidental overdoses.

Further objects and advantages of the invention will become apparent by reference to the following description and accompanying drawings.

SUMMARY OF THE INVENTION

In accord with the present invention, a dispensing system is provided which has a carousel and a removable tray with a pre-determined number of bins for containing tablets or capsules, or the like, which are filled with doses as may be prescribed by a physician. The bins are pre-loaded with the desired tablets or capsules and are individually dispensable at pre-selected times through an access window by merely turning over or tipping the dispensing system. The carousel in the dispensing system is rotated as desired, by suitable drive means which serves to position successive bins at the access window for dispensing of the tablets or capsules. The carousel may also be automatically indexed to a specific pre-selected position. The drive means is actuated at timed intervals by means of a programmed microcomputer. The microcomputer controls a motor which causes the drive means to operate and position a successive bin below the access window. A sound and visual alarm is also provided, the sound timed at intervals may have variable volume and frequency to accommodate certain hearing afflictions, whereas the visual alarm may have a continuous blinking display to alert the recipient of the time for taking a dose. The dispensing system may also be provided with a time indicator to advise as to the particular time of day or night. A keypad is provided, with visual confirmation, to set the microcomputer program in order to vary the times for doses, as desired, and/or as prescribed. Further, the dispensing system may be questioned as to the remaining number of usable dose periods.

The dispenser can be manufactured in small size and light weight so that it can be carried in a pocket or purse and can be readily available for use.

DRAWINGS

DETAILED DESCRIPTION OF INVENTION

Figure 1:
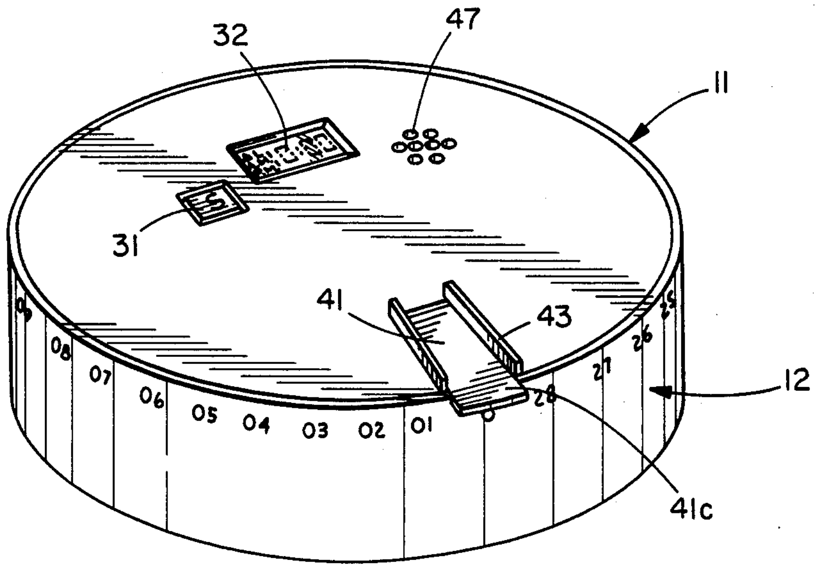
FIG. 1 is a perspective view of the dispensing system of the invention.
Figure 2:
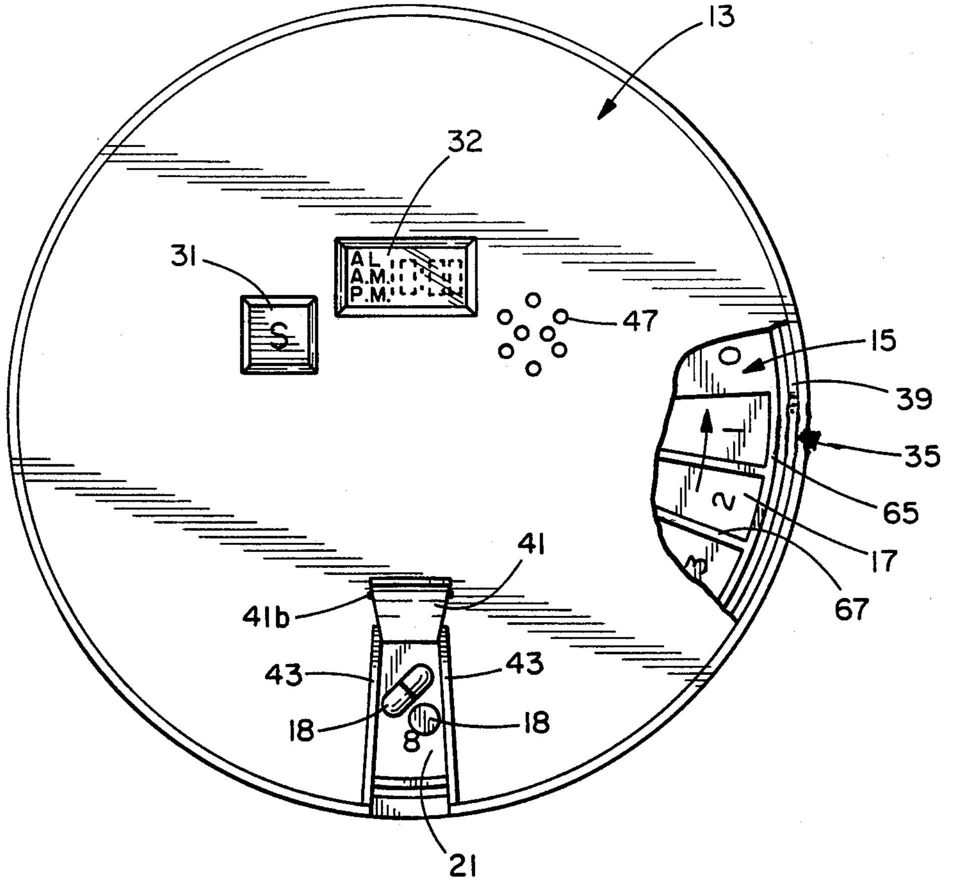
FIG. 2 is a plan view of the dispensing system shown in FIG. 1 with the access window being shown open and showing a tablet and capsule in a bin, the top being partially broken away to indicate other bins in the dispensing system.
Figure 3:
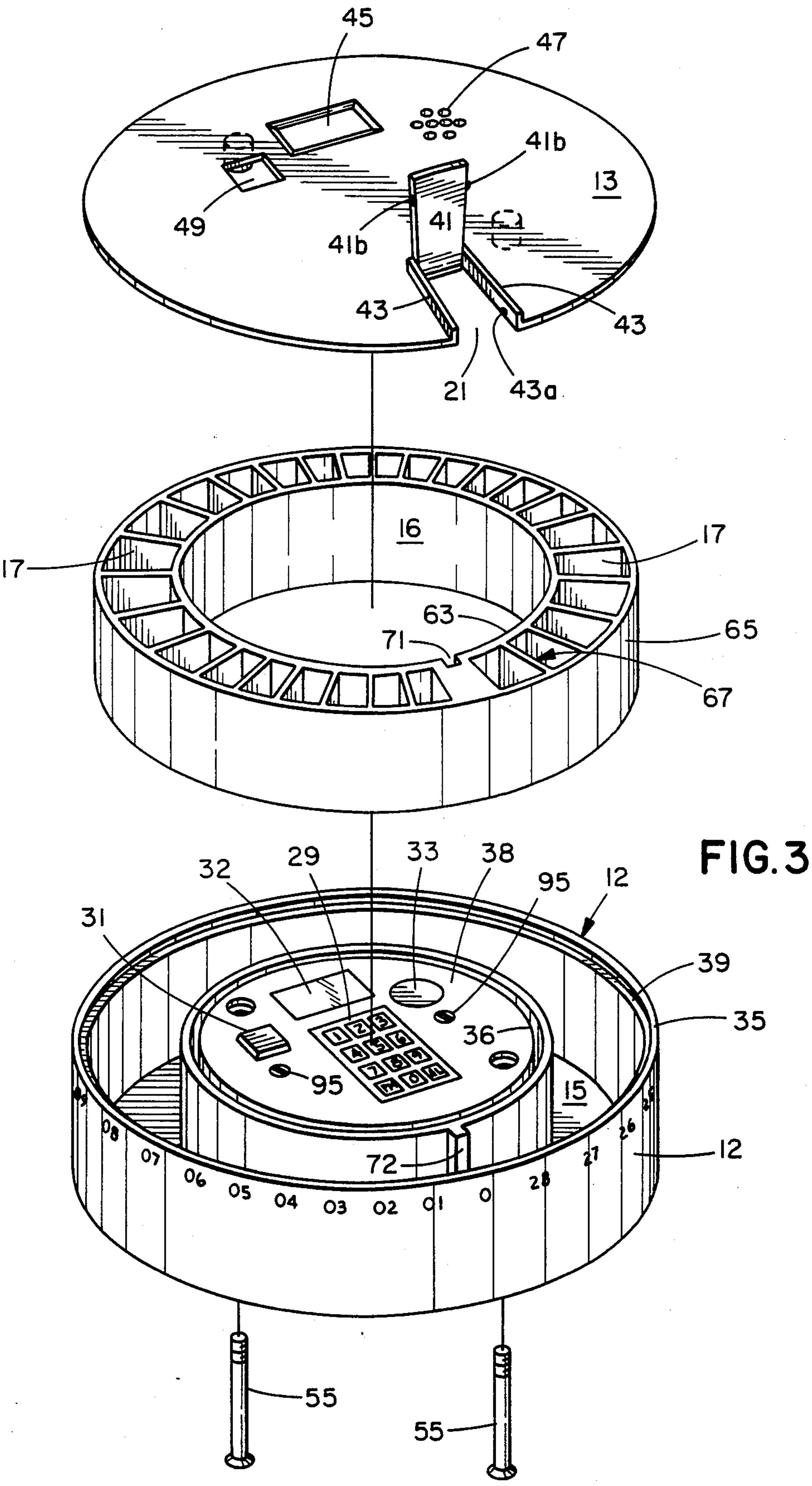
FIG. 3 is an exploded view, in perspective, of the dispensing system shown in FIG. 1.
Figure 4:
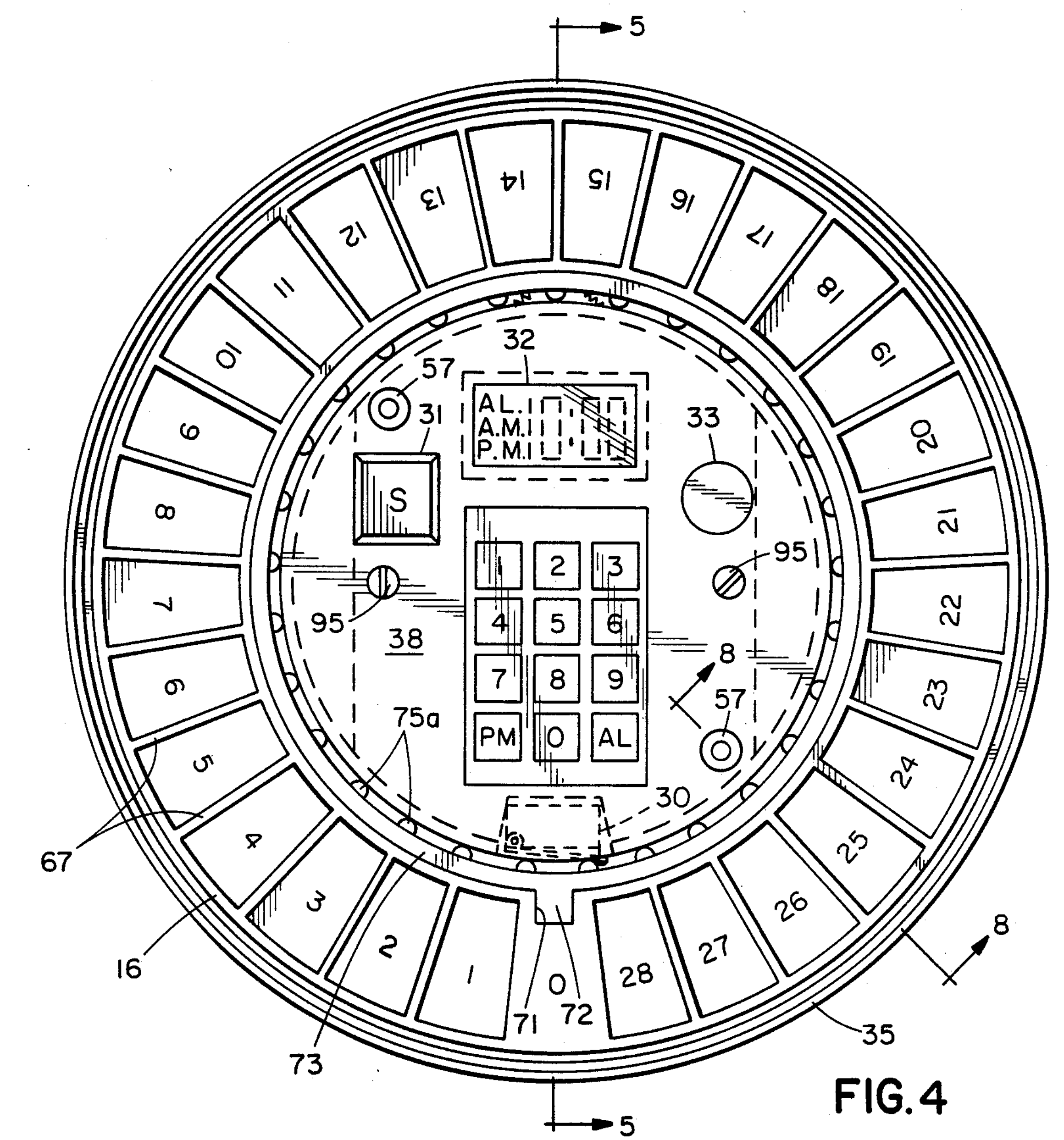
FIG. 4 is a plan view of the dispensing system with its top cover removed.
Figure 5:
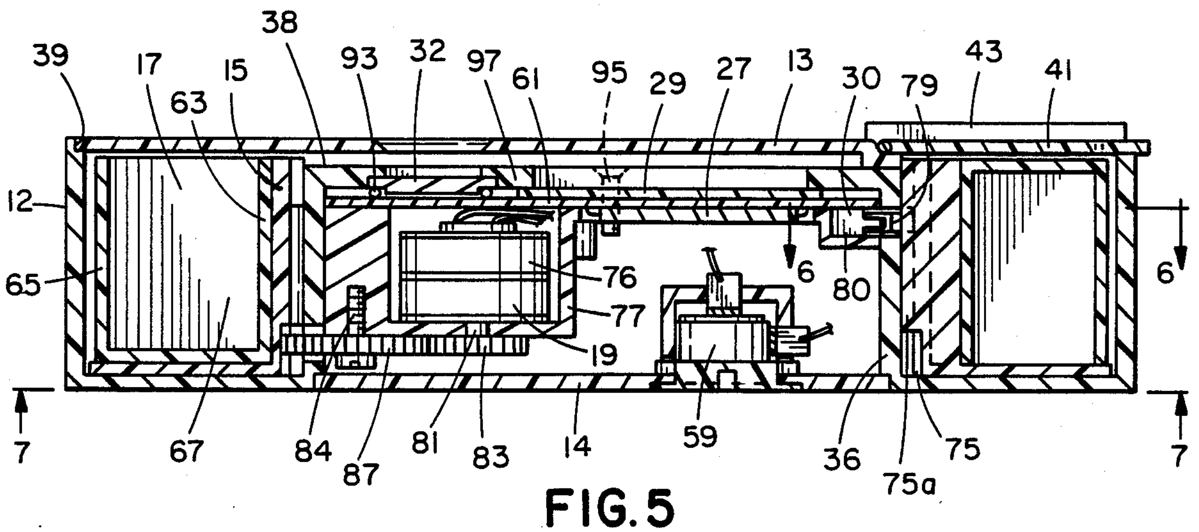
FIG. 5 is a cross-sectional view of the dispensing system of the invention, including the top cover, the view being taken along lines 5—5 in FIG. 4.
Figure 6:
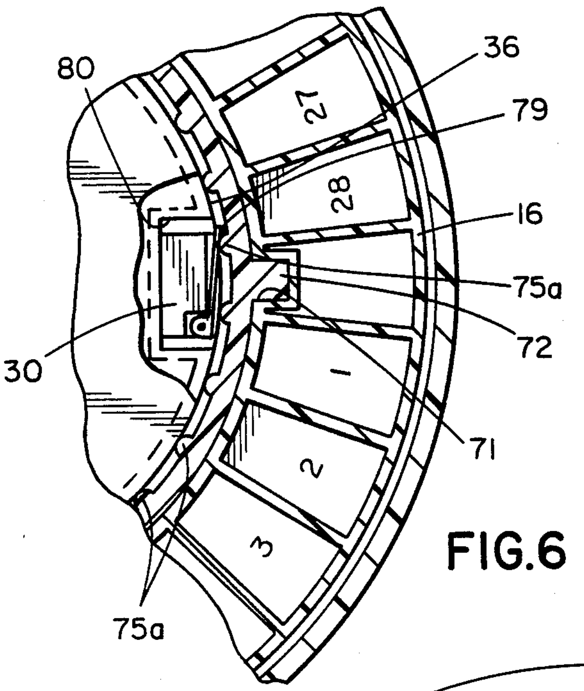
FIG. 6 is a partial plan view of the dispensing system with the top cover removed and particularly showing a micro switch which is adapted for signalling the stopping of the drive means.
Figure 8:
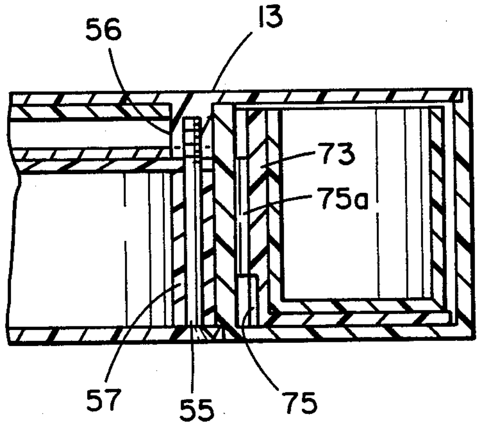
FIG. 8 is a partial cross-sectional view, taken along lines 8—8 in FIG. 4.
Figure 7:
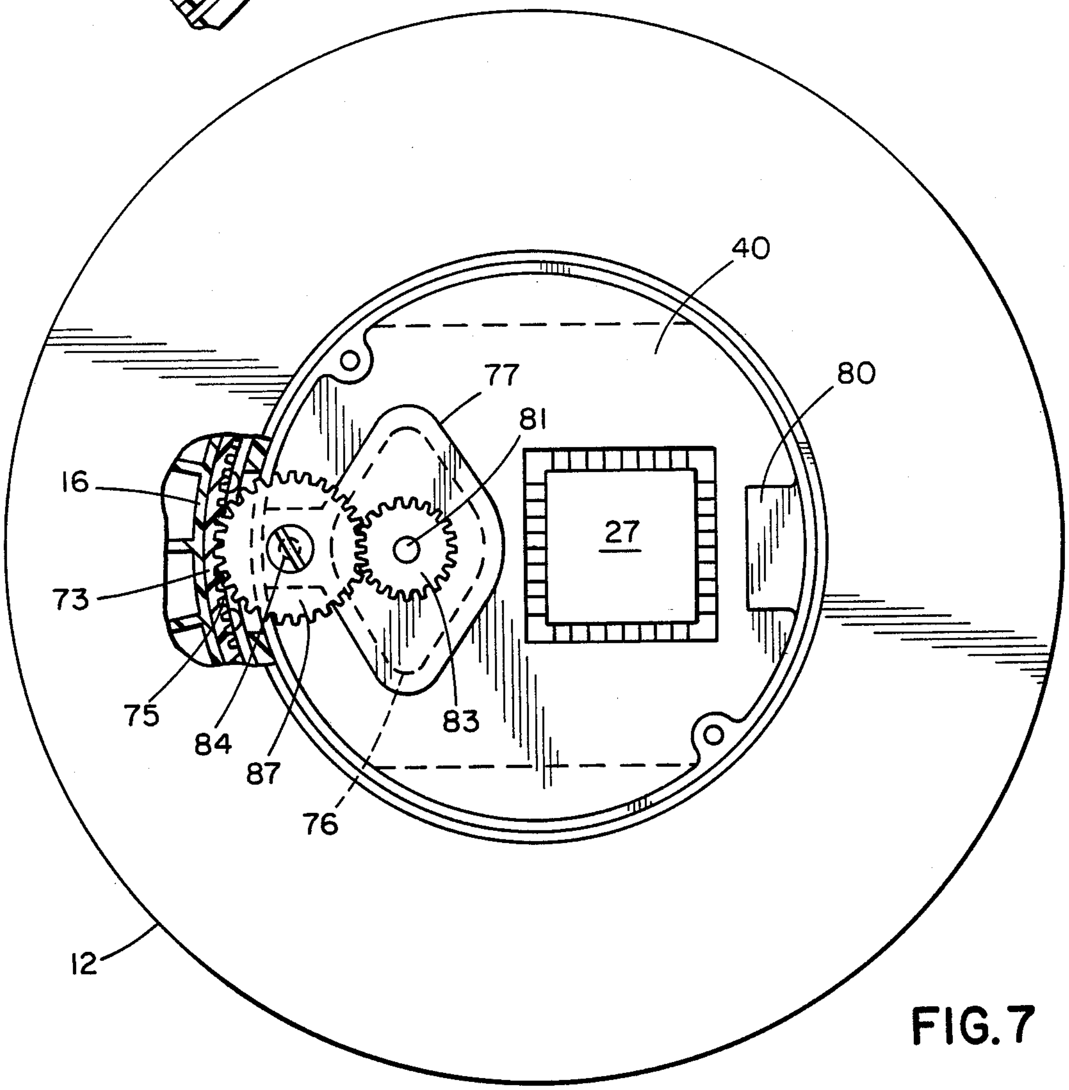
FIG. 7 is a bottom view, looking up into the dispensing system, partially broken away, taken along lines 7—7 in FIG. 5, the view particularly indicating the gear train for rotating the carousel.

The dispensing system 11 of the invention comprises a light, generally cylindrical, base unit 12 having a top cover 13 and bottom cover 14, a carousel 5, in which may be disposed a removable tray 16 having a plurality of spaced bins 17 for receiving capsules and tablets 18 in desired or prescribed amounts. The carousel 15 is indexed by drive means 19 which functions to index the carousel at a position to place a bin 17 below an access opening 21 in the top cover 13. The access opening 21, as shown in the drawings, is positioned at the six o'clock position.

Processor 23 (FIG. 10) serves to actuate the drive means 19 at periodic times and comprises a programmed microcomputer 27 and associated electronic components 28 (see FIG. 10) responsive to input provided through a keypad 29. The processor 23 further comprises a micro switch 30 and a pushbutton 31. A liquid crystal display or LCD 32 which displays through the top cover 13, and acoustic alarm 33 are also a part of the processor 23 to cause the recipient to be made aware of the time for a dose. The LCD 32 also serves to cause the recipient to be made aware by blinking thereby functioning as a visual alarm.

The base unit 12 includes an outer circular sidewall 35, a concentric inner circular wall 36 connected by a bottom 37 to the sidewall 35. A flat section 38 overlies the inner circular wall 36. An indentation 39 is provided at the top edge of the outer circular sidewall 35 for receiving the top cover 13. A supporting bracket 40 fits into the inner circular wall 36 under the flat section 38. The base unit 12, top cover 13 and bottom cover 14 are desirably opaque, so that only the capsules and tablets 18 to be immediately dispensed can be seen through the access opening 21 at the time of a dose.

The top cover 37 is provided with an access window 41 at the access opening 21. The capsules and tablets 18 are accessible through the access opening 21 upon opening of the access window 41. The access window 41 is suitably pivoted at its inner end by means of a hinge **41*a* and is provided with locking means 41*b* to hold it closed. The access window 41 extends outwardly of the base unit 12 to provide a finger grip 41*c* for opening purposes. Upstanding guide means 43 on the top cover 13 extend generally radially at each side of the opening 21 and are disposed at the edges of the access window 41. Dimples 43*a* are provided to receive the locking means 41*b***.

The top cover 13 also has an opening 45 for viewing the LCD 32. This opening may be covered by a transparent face, but the LCD 32, itself, may have a protective cover over its face. The top cover 13 also includes a series of openings 47 to conduct sound from an acoustic transducer such as a speaker 48. Another opening 49 is provided for the pushbutton 31, which is available to turn off the acoustic alarm 33, stop LCD blinking, the visual alarm, and to make inquiry as to dose periods (p) and dose days (d) remaining.

The bottom cover 14 is a plate which is preferably sealed to the base unit 12 to be removable only for possible servicing needs of components in the interior of the dispensing unit 11. Long screws 55 extending from the bottom cover are used to hold top cover 13. They extend through guides 57 on the bottom cover 14 and thread into metal inserts in bosses 56 of the top cover 13. Friction means are provided in the guides 57 so that the screws 55 remain attached to the bottom cover even when top cover is removed. The screws require a tool for removal so as to provide child-resistant to removal. A readily removable insert 58 preferably screwable with a coin, is provided for access to a battery 59, which seats in a housing 60. The battery serves to power the processor 23 and the drive means 19.

The bracket 40 supports a P.C. board 61 which is also spaced inwardly of the circular sidewall 36 below the flat section 38. The P.C. board contains the processor 23, and keypad 29.

Figure 9:
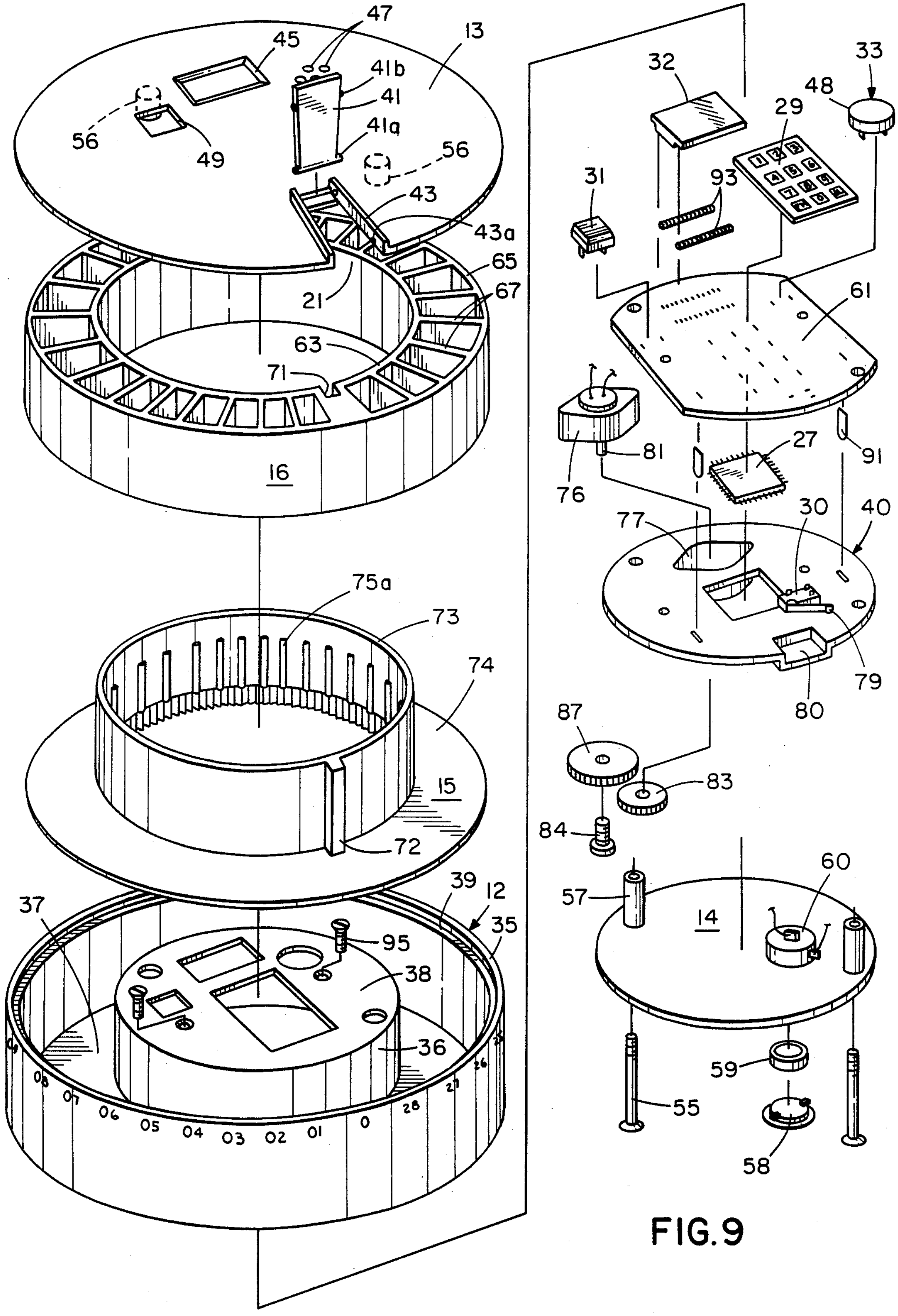
FIG. 9 is an exploded view of the dispensing system showing the interrelationship of various parts.

The carousel 15 contains the tray 16. The tray 16 provides a series of bins 17 which are defined between an inner wall 63 and an outer wall 65. The sides of the bins 17 are defined by vertically extending sidewalls 67 which extend generally radially between the inner wall 63 and outer wall 65. The bins 17 have a bottom 69. A key slot 71 is disposed in the inner wall 63 and, as shown particularly in FIG. 9, is vertically extending and generally rectangular in shape. The key slot 71 engages a key 72 on the carousel 15.

The carousel 15 comprises a vertically extending, circular wall 73. The circular wall 73 is provided on its outer face with the key 72 which engages the keyslot 71. At the base of the circular wall is a circumferential, outwardly extending ring 74 which carries the tray 16. At the bottom on the inner face of the circular wall 73 are inwardly extending gear teeth 75 for engaging the drive means 19. The inner face of the wall 73 of the carousel 15 is also provided with a series of vertically extending, circumferentially spaced protuberances **75*a* which are radially spaced and located above the gear teeth 75. The protuberances co-act with the micro switch 30 as the carousel rotates in the base unit 12, as will be hereinafter pointed out. By means of the drive means 19, the carousel 15 is rotated under the direction of the processor 23, to place the bins 17 in desired sequence below the access opening 21**.

The drive means 19 includes a motor 76 which is inserted into a well 77 provided in the bracket 40. The motor 76 is powered by the battery 59 so as to give portability to the dispensing system 11. The motor 76 is initiated by the microcomputer 27 and is terminated by the microcomputer upon a signal from the micro switch 30. The micro switch includes a lever actuator 79, the outer end of which is adjacent to the wall 73 and engages the protuberances **75*a*, as will be described hereinafter. The micro switch 30 plugs into the P.C. board 61 and is disposed in a recess 80 in the bracket 40**.

The motor 76 has a shaft 81 on which is mounted a drive gear 83. The gear 83 engages an idler 87 gear journalled on a screw 84 which threadedly engages the bracket 40. The idler gear 87 engages the teeth 75 on the carousel 15. Thus, the motor 76 drives the carousel 15 through the gears 83 and 87 causing a rotation of the carousel 15 and therefore the bins 17 in the tray 16. The protuberances **75*a* bear against the inner wall 36 of the base unit 12 which provides a bearing surface thereby assuring proper engagement of the idler gear 87 and carousel teeth 75**.

The drive means 19 is supervised by the processor 23 which serves (a) to dispose the bins 17 at programmed times below the access opening 21, by means of the drive means 19; and (b) to control the acoustic alarm 33 and visual alarm through the LCD 32, all in response to the operation of the microcomputer 27. The keypad 29, the micro switch 30 and pushbutton 31 provide input to the microcomputer 27.

The LCD 32, pushbutton 31, keypad 29, and the speaker 48, are all carried on top of a double-sided P.C. board 61, which is mounted on the bracket 40, as indicated in FIG. 9. The microcomputer 27 is placed on the bottom of the P.C. board 61 together with the necessary resistors, capacitors, and quartz crystal generally designated in FIG. 10 by numeral 28. The P.C. board 61 has aligning means 91 which extend into the bracket 40. The screws 55 extend through the P.C. board 61 which has a cutout to provide room for the microcomputer 27 and associated electronic components 28.

Contact elements 93 of alternating layers of conducting and insulating material are disposed intermediate the LCD 32 and P.C. board 61. Suitable pressure is maintained by means of screws 95 which extend through the flat section 38 of the base unit 12 and through the P.C. board 61, and which threadedly engage the bracket 40. Stop 97 is provided to limit the pressure applied by the screws 95.

A series of numbers are on the outside of the base unit 12 (FIG. 1) and the bins 17 are also numbered. The base unit numbers will facilitate indexing if ever battery power is lost as will be described hereinafter.

It will be noted that the keypad 29 is neither accessible nor exposed to an external surface of the dispensing system 11 and the top cover 13 needs to be taken off to provide access to the keypad 29. This will prevent accidental changes to the programmed alarm.

The processor 23, as before pointed out, is under the direction of the microcomputer 27. The microcomputer is a low power single chip LSI microcomputer such as a Sharp SM-530 microcomputer or can be a custom manufactured integrated circuit. With the program code and support system available from the manufacturer of the microcomputer 27 and with an understanding of the below-described flow charts, one skilled in the art can provide the necessary program required for mask programming into the ROM of the microcomputer. FIGS. 10 through 18, inclusive, set forth a block diagram and flow charts for the processor 23.

BLOCK DIAGRAM (FIG. 10)

Figure 10:
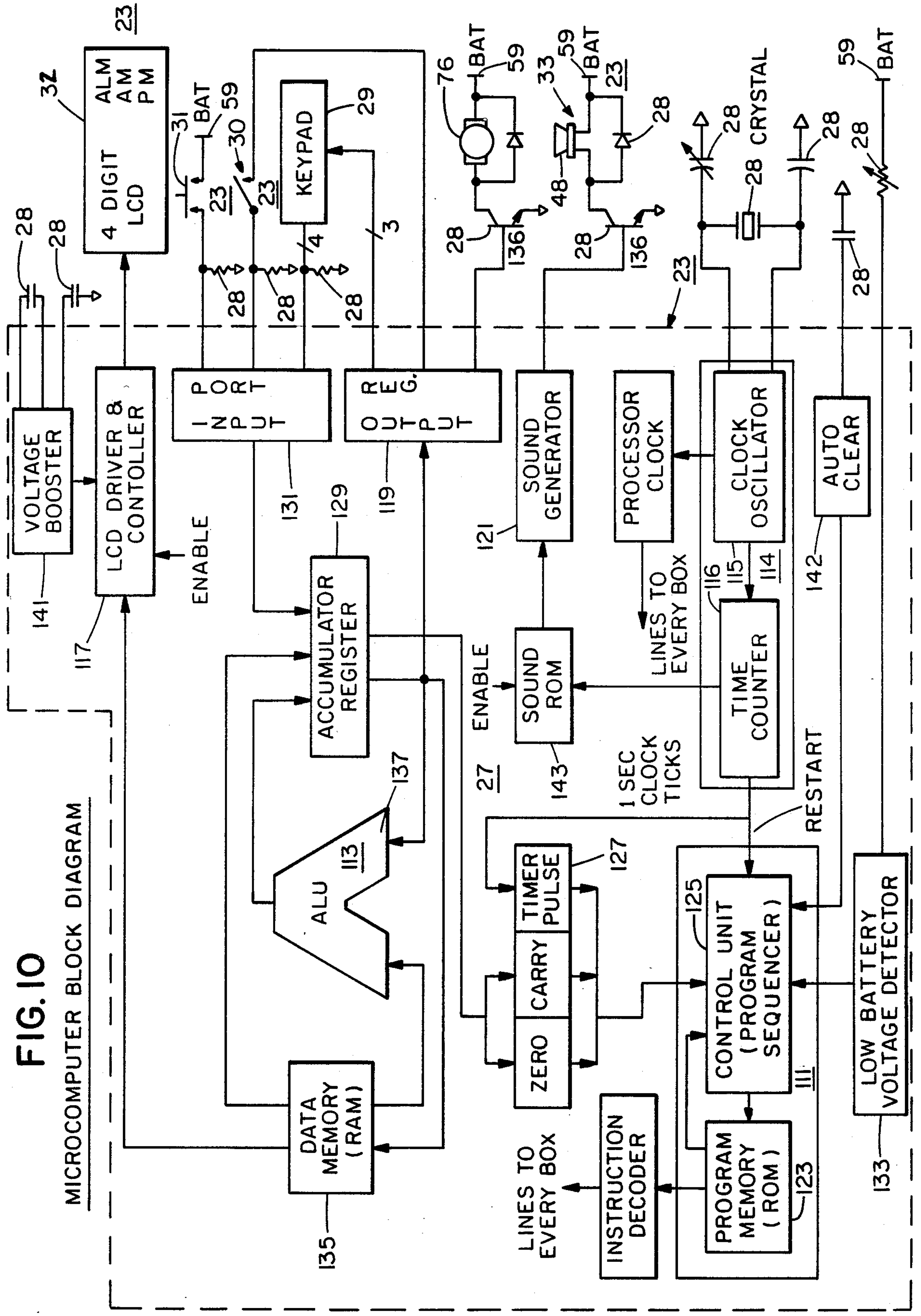
FIG. 10 is a block diagram showing the processor in the dispensing system.

The left portion of FIG. 10 represents a simplified block diagram of the microcomputer 27. The major components of the microcomputer 27 are:

Control Unit and Program Memory, 111
Arithmetic Logic Unit and Data Memory, 113
Timer, 114
LCD Driver and Controller, 117
Input Port 131 and Output Register, 119
Sound Generator, 121

The control unit and program memory 111 determine the sequence of actions and calculations performed by the microcomputer 27. The instruction sequence or program is stored in the program memory 123, a mask programmed ROM. The control unit 125 determines the address of the next instruction to be executed. The next address can be either the next consecutive address, an address resulting from an unconditional branch, such as a subroutine call (a change in program flow), or a choice of one of two addresses dependent on the result of a test (conditional branch).

The conditions that can be tested for conditional branch instructions in a status bits register 127 are: zero, carry or timer pulse. The zero and overflow tests are tests of the results of an arithmetic or logical operation. The zero test, tests the accumulator contents for zero. This test is useful for comparing two numbers. The carry test, tests for carry or borrow from the most significant bit of the accumulator register 129 during an arithmetic or logic operation. The timer pulse test, tests whether or not a timer pulse has occurred.

The control unit 125 places the microcomputer 27 in an idle state when a halt instruction is executed. This is used to conserve power when no calculations are needed. The control unit 125 resumes program execution when a timer pulse occurs or an input is provided at the input port 131.

A low battery voltage detector 133 permits the program to periodically test the battery voltage. If the battery voltage is low, the program initiates a warning to the user. The low battery voltage detector 133 provides input to the control unit 125.

The arithmetic logic unit and data memory 113 include the accumulator register 129, data memory (RAM) 135 and arithmetic logic unit or ALU 137 which are used to process data from the input port 131 (keypad 29, pushbutton 31, and micro switch 30) and to generate signals to activate the motor 76, acoustic alarm 33, LCD 32 blinking, keypad 29 and micro switch 30 scan lines.

The ALU 137 provides basic arithmetic and logic capabilities. The ALU 137 accepts input operands from the data memory 135 and the accumulator register 129. It provides the capability to add the contents of data memory to the accumulator, shift the accumulator contents and complement the accumulator. Results of the ALU operations are always deposited in the accumulator register 129.

The data memory 135 is used to hold variables and intermediate results of calculations. The data memory stores items such as clock time, alarm time and flags such as motor running and speaker flags which are used to control program flow.

Data typically flows from data memory 135 or the input port 131 to the accumulator register 129. Once data enters the accumulator register, it can be operated on by the ALU 137. For example, the keypad 29 status is read into the accumulator register 129 via the input port 131. The accumulator register contents are then sequentially compared to constants stored in ROM to determine which key of the keypad 29 was activated. These constants are equal to the numerical value of each key. The result of each comparison is tested by the control unit 125 to determine if a key of the keypad 29 depressed is equal to the stored constant. When the comparison is satisfied, the control unit 125 transfers control to that part of the program which processes that particular key.

The accumulator register 129 and ALU 137 also operate for time keeping purposes. Values for clock time, seconds, minutes and hours, are stored in data memory 135. When a 1 second clock tick occurs, the control unit 125 resumes operation from the idle state. The contents of the data memory (RAM) 135 location storing the seconds' least significant digit are transferred to the accumulator register 129. This value then passes through the ALU 137 where one is added to it. The incremented value is returned to the accumulator register 129. The contents of the accumulator register (the updated least significant seconds' digit) are then passed through the ALU 137 where they are compared with a constant value of 10 which is stored in ROM 123. If the comparison is true, the accumulator register 129 is reset to zero and this zero value is stored in the least significant seconds' digit. The 10's of seconds' digit is then passed from data memory 135 to the accumulator register 129 and then through the ALU 137 where a one is added. The resultant 10's of seconds' digit is returned to the accumulator register 129. It is then passed through the ALU 137 where it is compared with the constant six. If the comparison is true, the accumulator register 129 is reset to zero and stored into the 10's of seconds' digit in data memory 135. The least significant minute digit is then loaded into the accumulator register 129, incremented and tested. This process is repeated for each successive time digit until no further carries occur.

The timer 114 of the microcomputer 27 accepts pulses from a 32768 Hz clock oscillator 115 which passes through a 15-bit time counter 116 to generate the basic 1 second clock ticks used by the microcomputer 27 for time keeping. These 1 second ticks are fed to the control unit 125 where they cause the microcomputer 27 to advance from the idle state to the active state.

The LCD driver and controller 117 provide the signals required to drive the LCD 32. The LCD driver and controller 117 runs independently with respect to the control count; i.e., it will continue to generate the LCD drive signals even when the control unit 125 is in an idle state. The LCD driver and controller 117 sequentially accesses a region of the data memory 135 that is dedicated to the LCD 32. The LCD segment format representation of the numbers to be displayed are stored, via the accumulator register 129, in this dedicated area. The LCD driver and controller fetches from the data memory 135 the LCD segments to be displayed, and drives the appropriate segment select lines. The LCD driver and controller 117 may be enabled or disabled under program control. The LCD driver and controller 117 also generates the a.c. waveforms required to operate the LCD 32. In addition, the LCD driver and controller 117 is powered by a voltage booster 141 to boost the 1.5 volt processor battery voltage to the 2.5 to 3.0 volts required by the LCD 32.

The microcomputer 27 input port 131 and output register 119 provide it with the ability to sense external inputs and control external devices. One of the bits at the output register 119 drives the carousel drive motor 76 through a discrete transistor buffer 136. Other bits at the output register 119 are used to sequentially scan the keypad and to test the micro switch state. The output register 119 contains a register that is loaded from the accumulator register 129 contents. Thus, when the motor 76 is to be activated, for example, a constant corresponding to the bit assigned to the motor 76 is loaded into the accumulator register 129 and then transferred to the output register. The output register 119 will then keep the motor activated until reset by another value from the accumulator register. This allows the accumulator register 119 to be used for other operations while the motor 76 is running. The speaker 48 is driven by a dedicated output line through a discrete transistor buffer 136.

The input port 131 provides means to sense the state of external devices such as the keypad 29, micro switch 30, and pushbutton 31. These inputs are selectively read into the accumulator register 129 where they are tested for contact closures by ALU 137 operations.

The keypad 29 illustrated has a four by three xy matrix. The three y lines of the keypad are connected to three output register 119 bits while the four x-lines are connected to four input port 131 bits. The keypad is scanned by first loading the accumulator register 129 from data memory 135 with a constant corresponding to one of the y-lines. This selects four of the twelve keypad 29 keys. The state of these four keys is then read into the accumulator register 129 via the input port 131. The accumulator register 129 is then tested for the non-zero condition to determine if one of four selected keys was depressed. If the accumulator register is non-zero then each bit of the accumulator register 129 is sequentially tested via the ALU 137 to determine which key has been pressed. If not, the accumulator register is loaded with a constant which selects the next keypad 29 scan line and resets the other keypad scan lines. This value is transferred from the accumulator register to the output register 119 to select the next four keys on the keypad. The state of these keys is read in and tested as described above. The whole process is then repeated for the third group of four keys. In this manner, the entire keypad 29 is read into the microcomputer 27 and processed.

The acoustic alarm 33 includes a sound generator 121 and sound ROM 143 to provide the means to drive an external speaker 48. Sound generator 121 instructions specifying timed sequences of tones are programmed into the sound ROM 143. When the sound ROM 143 and sound generator 121 are enabled under program control, they generate a program specified, timed sound signal which drives the speaker 48. Sounds with different tone content, e.g., different frequency, are generated by selecting different sound generator instruction sequences stored in the sound ROM. Most speakers have sharp resonances in their sound output spectrum. Therefore, a loud volume can be produced by matching the sound generator output frequency to the speaker peak resonance frequency. Whereas lower volume may be achieved by shifting the sound generator frequency output slightly off the speaker peak resonance.

The autoclear 142 serves to clear the microcomputer 27 when first turned on.

SCAN TASK (FIG. 11)

The microcomputer 27 operates in a scan/idle mode in which it periodically wakes up, scans task flags to determine if any task needs service, services the task, and then reverts to the idle state. This mode minimizes power consumption.

Figure 11:
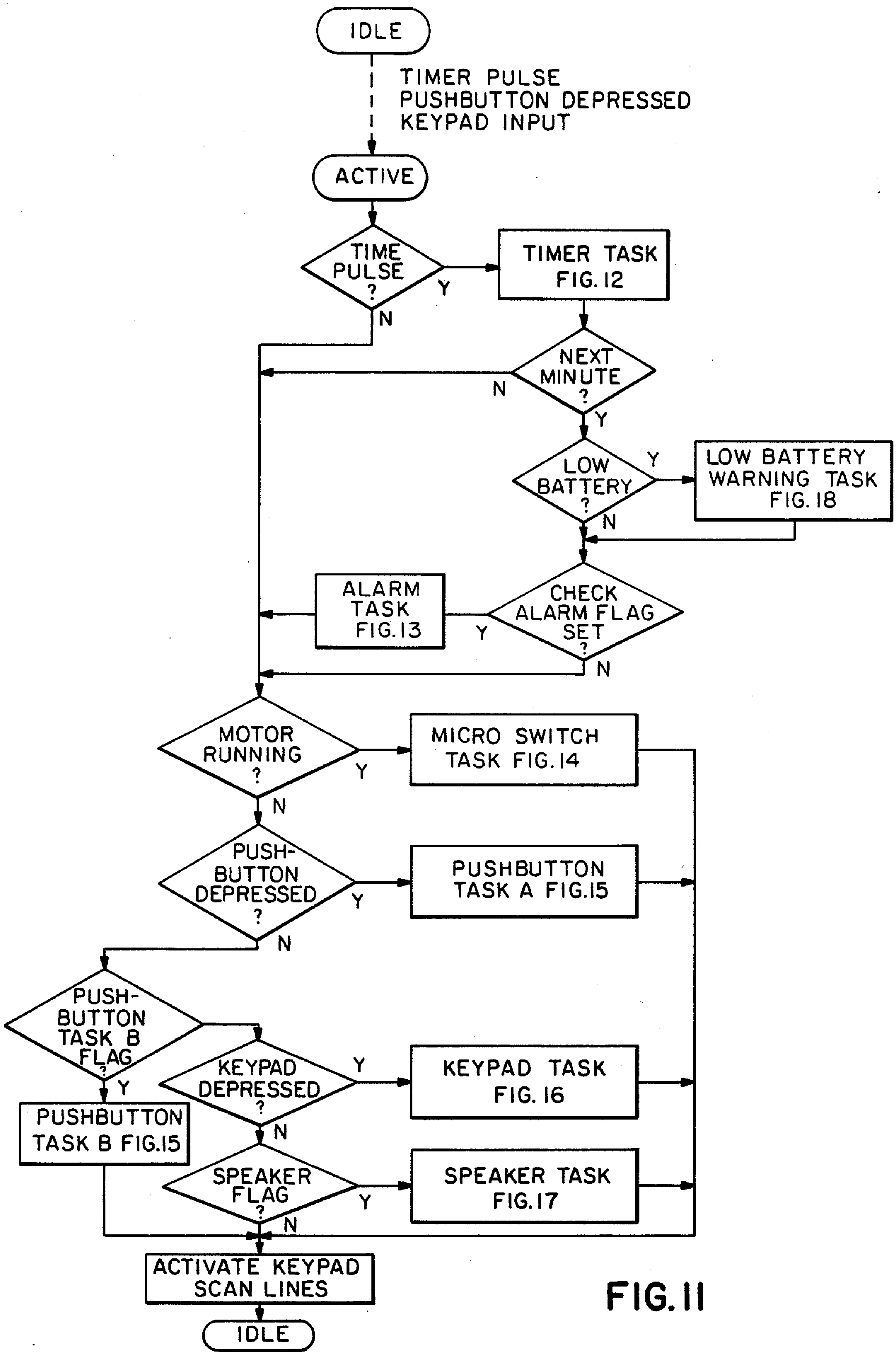
FIG. 11 is a flow chart showing the scan functions included in the program, generally in the order in which they are performed, for the dispensing system of the invention, which program is in the microcomputer.
Figure 12:
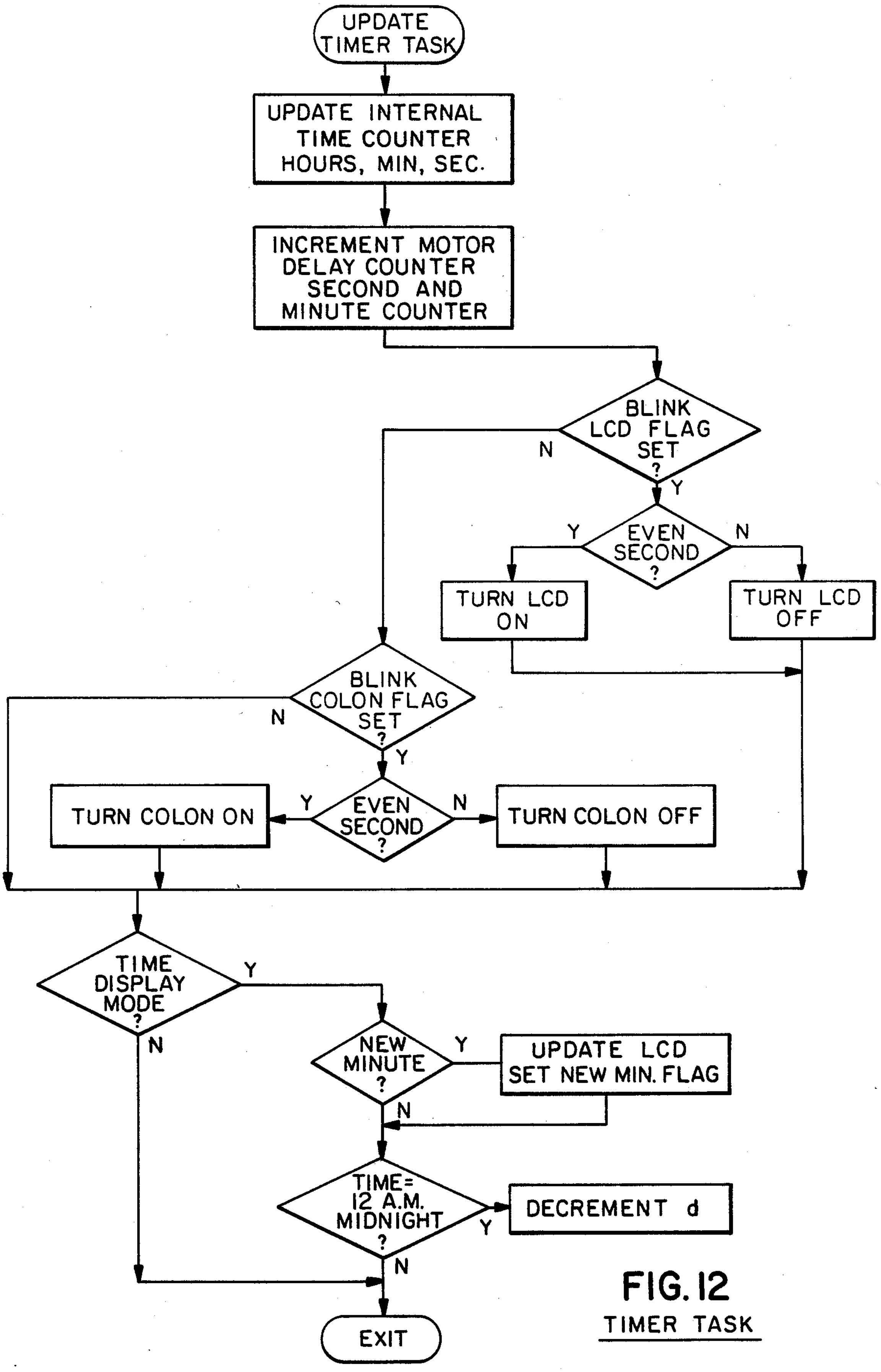
FIGS. 12 through 18 are also flow charts with respect to various of the scan functions set forth in FIG. 11, and indicated therein.
Figure 13:
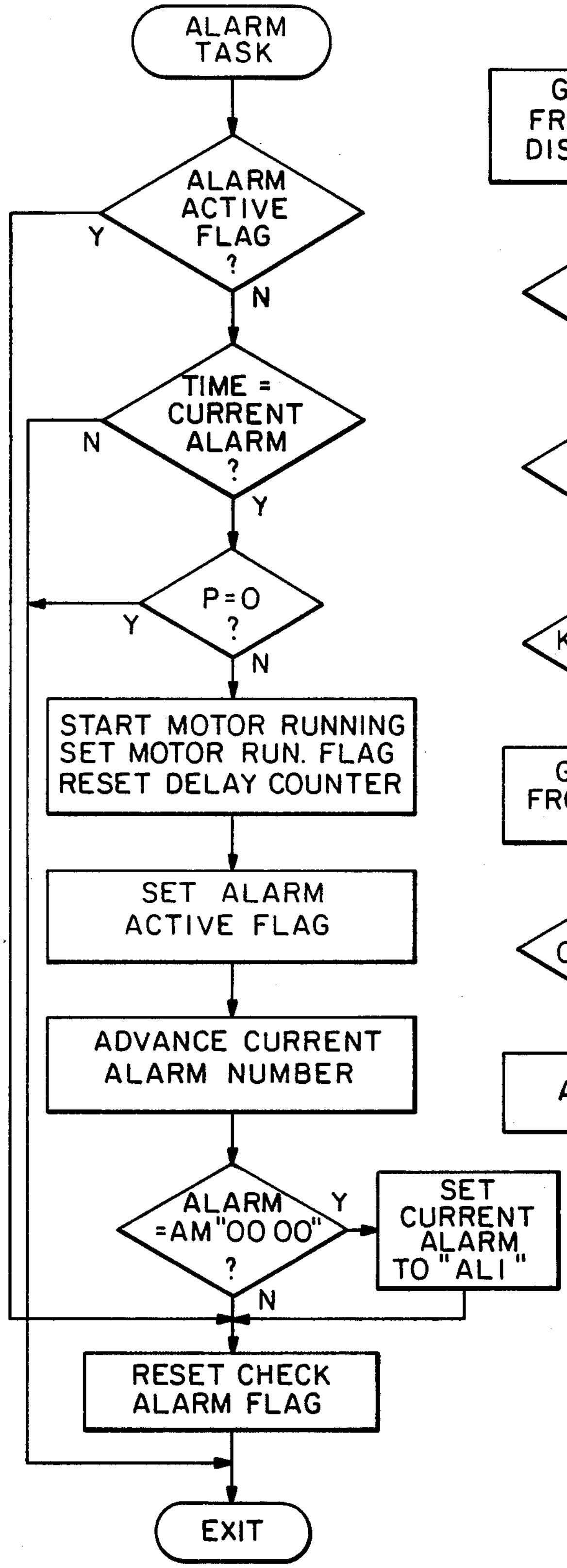
Figure 16B:
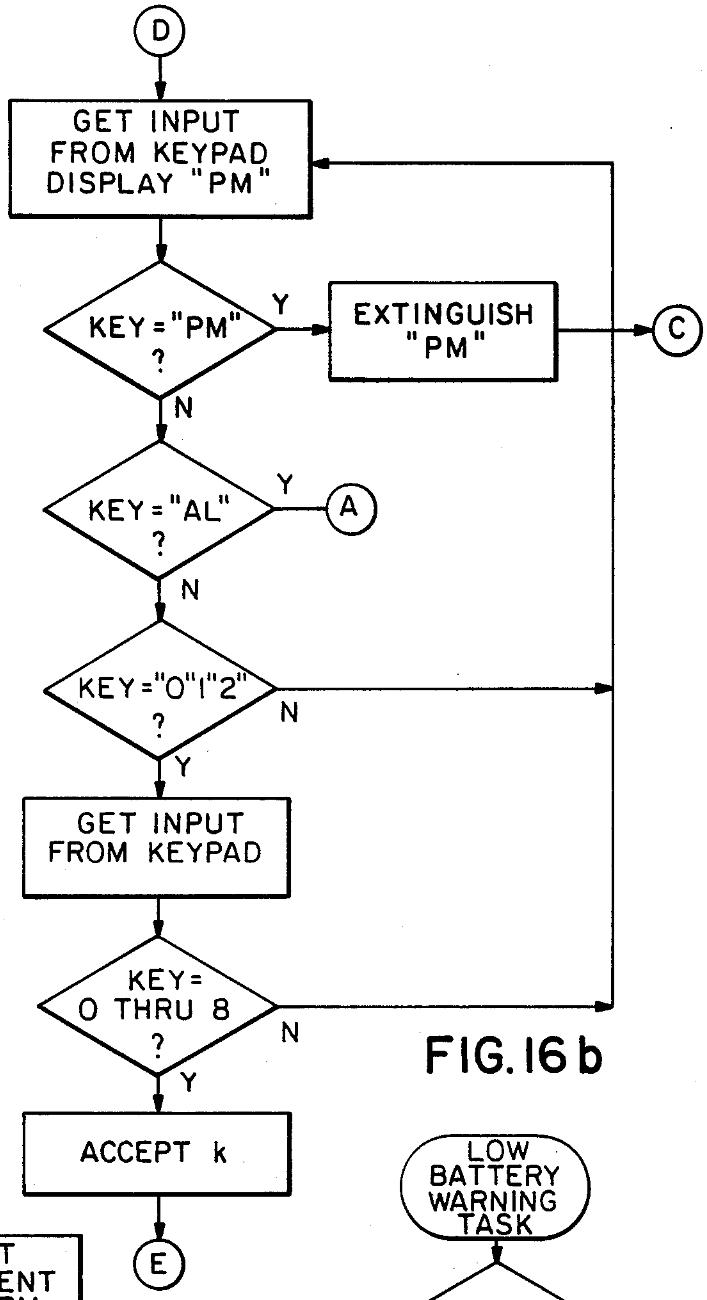
Figure 14:
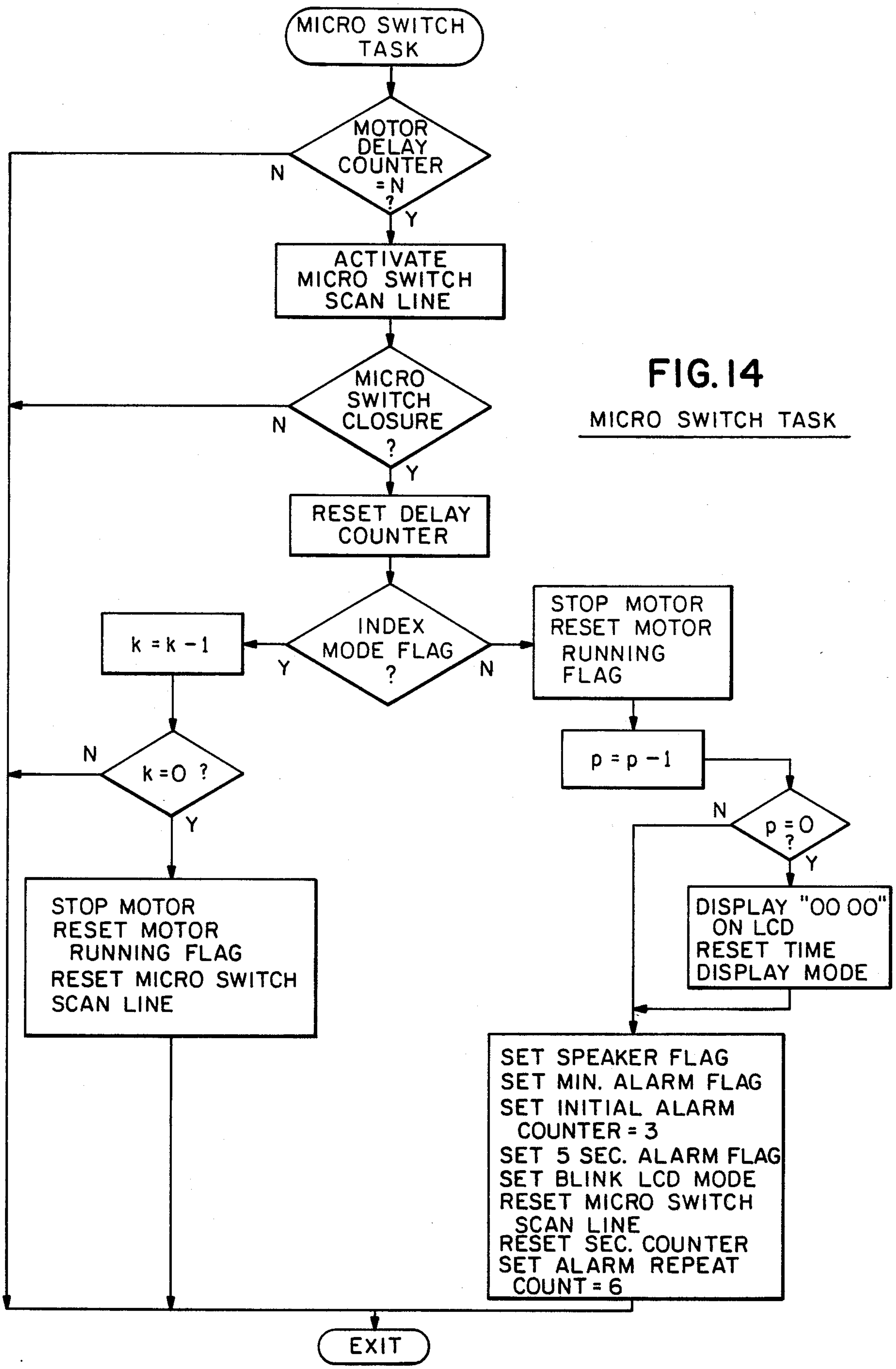
Figure 15:
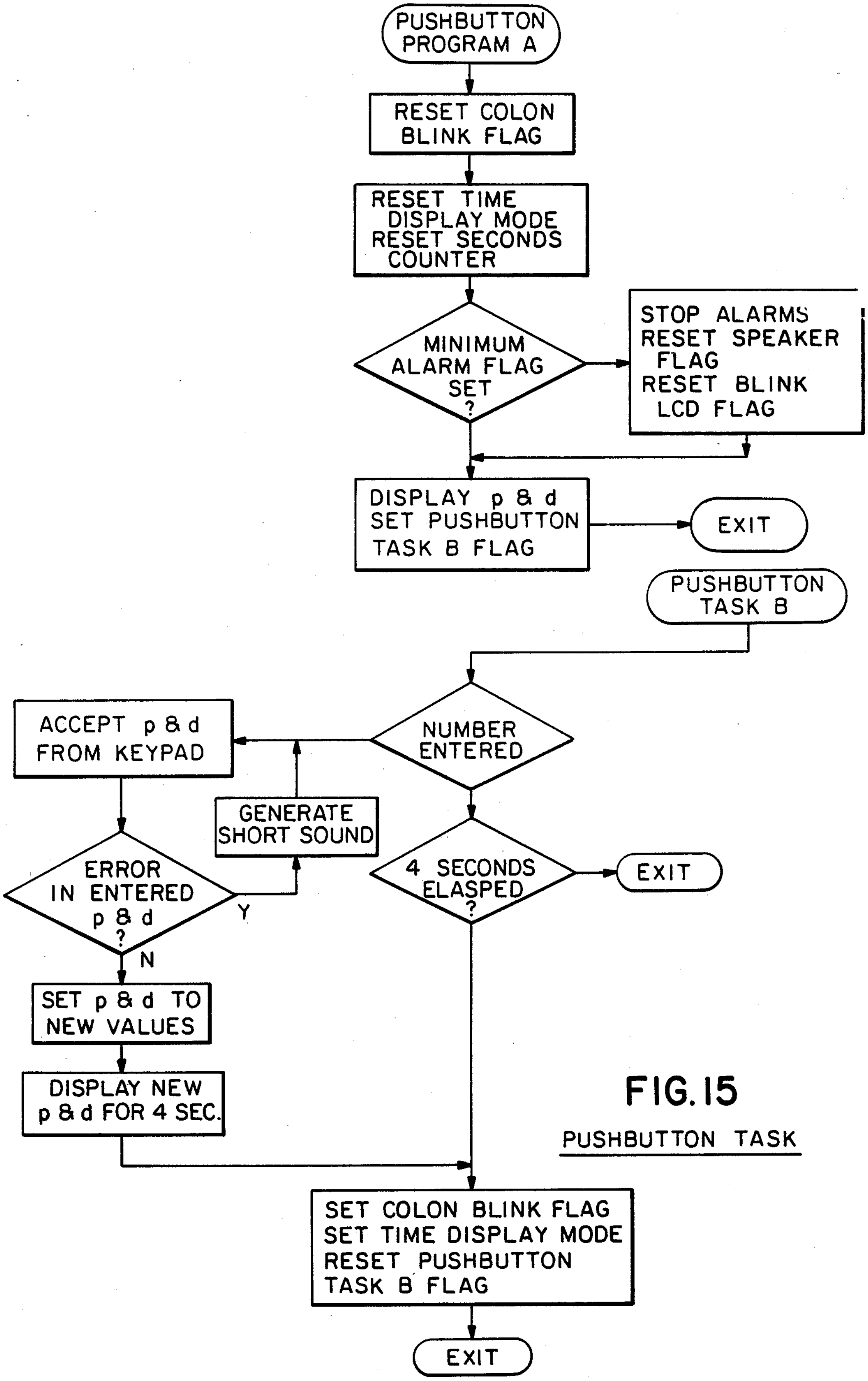
Figure 16:
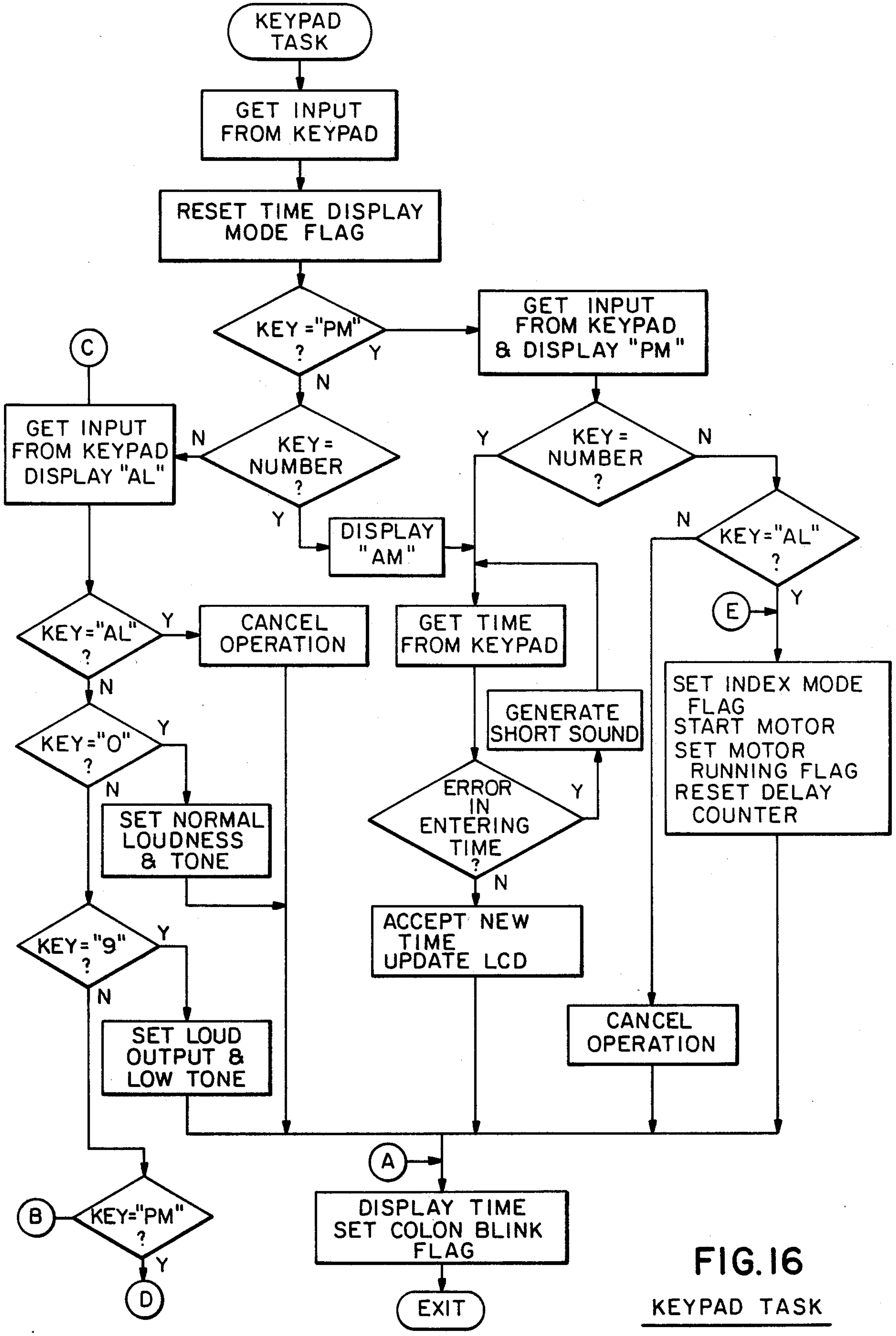
Figure 17:
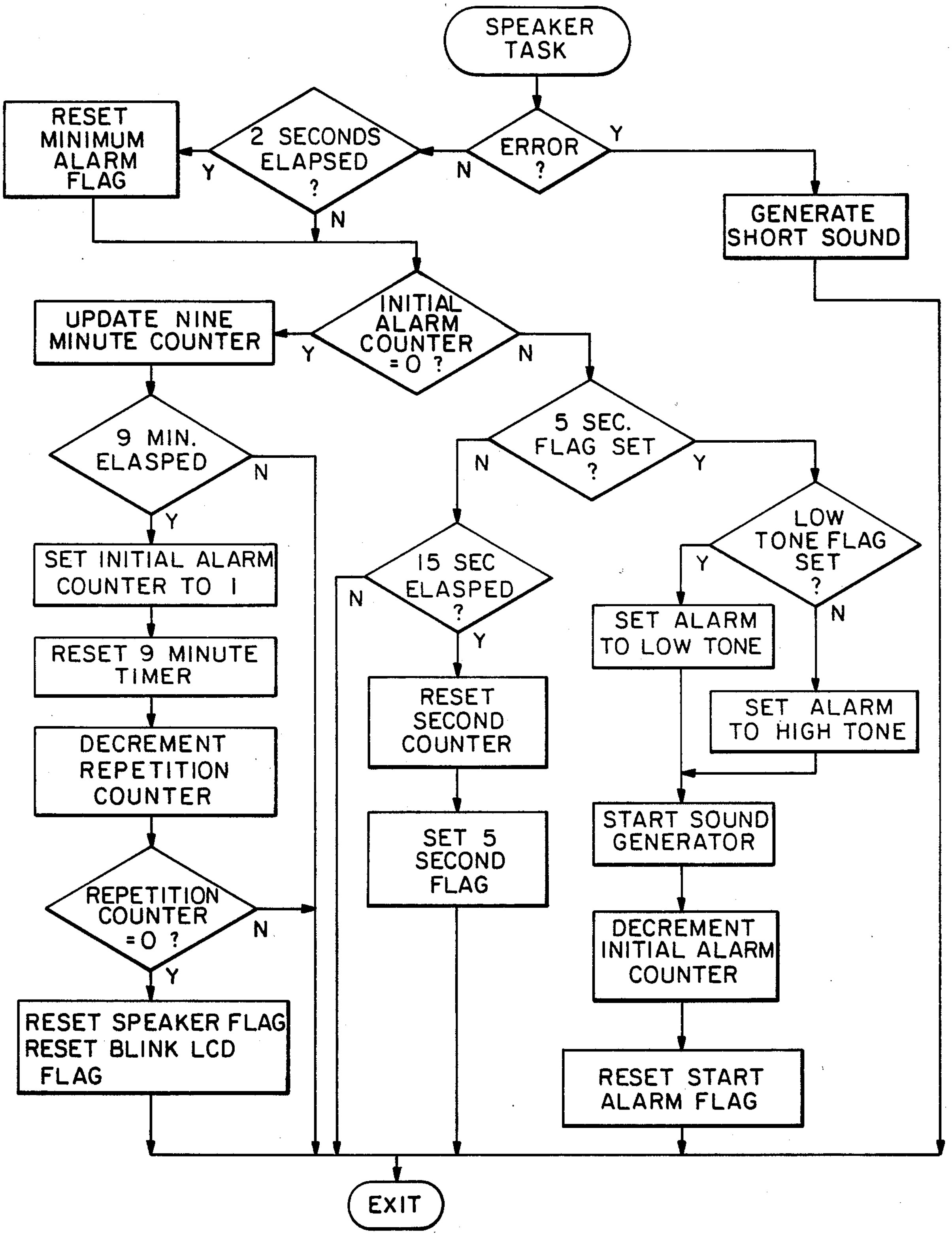

FIG. 11 illustrates the program flow for the scan loop. Upon occurrence of a clock tick (1.0 second period), keypad 29 signal or pushbutton 31 signal, the microcomputer 27 advances from the idle state to the active state. Upon entry to the active state, the microcomputer 27 scans its major tasks to determine if any task needs service. These tasks are as follows:

Timer, FIG. 12
Alarm, FIG. 13
Micro switch, FIG. 14
Pushbutton, FIG. 15
Keypad, FIG. 16
Speaker, FIG. 17

Figure 18:
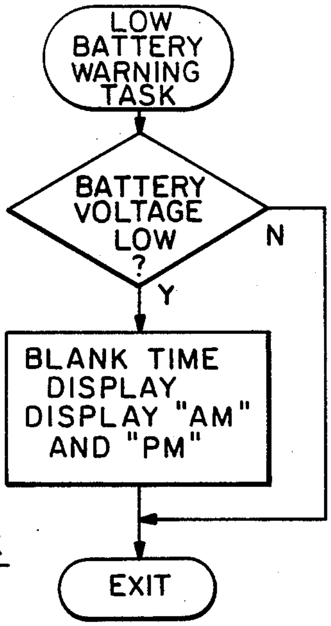

Low Battery, FIG. 18

As shown in FIG. 11, the "Timer task" always requires service; i.e., each time a clock tick occurs, the microcomputer 27 must update its internal clock time. The other tasks are serviced only when required. After servicing all tasks that require service, the microcomputer re-enters the idle state to await the next clock tick. It should be noted, that the design of the microcomputer 27 is such that the LCD 32 remains active when the microcomputer 27 is in the idle state. Before entering the idle state, the microcomputer 27 activates the three keyboard scan lines to enable microcomputer restart upon activation of any key in the keypad 29.

TIMER TASK (FIG. 12)

FIG. 12 shows the program flow for the timer task. The timer task is entered upon each clock tick. The first function of the timer task is to update the stored clock time which keeps track of clock time in hours, minutes and seconds. It then increments the seconds, minutes and motor delay counters. These counters are used by other tasks to measure time intervals. The timer task then checks to determine if the LCD 32 should be blinking to indicate an unanswered alarm. If so, the LCD 32 is turned on and off at alternate 1 second intervals. If the LCD is not to be flashed on and off, the timer task checks to determine if a colon should be blinking. If so, the colon is turned on and off at alternate 1 second intervals. Next, the timer task checks to determine if clock time should be displayed. If not, the task is exited. If time is to be displayed, the timer task determines if the next whole minute has been reached. If so, the LCD 32 time display is updated and flags are set to activate the alarm task and low battery task. The timer task then checks whether or not the clock time is 12:00 A.M. (midnight). If so, the number of dose days remaining is decremented. The timer task then exits.

ALARM TASK (FIG. 13)

The alarm task shown in FIG. 13 is entered whenever a check alarm flag is set. The first action of the alarm task is to determine if an alarm is already active; i.e., to check whether an alarm, to take the next dose, has been issued but unanswered by the user. If an alarm is active, the alarm task exits after resetting the check alarm flag. If an alarm is not active, the current clock time is compared to the time set for the current alarm number. If the alarm time has not been reached, the alarm task exits. If the alarm time has been reached, the number of remaining periods for taking a dose, p, is checked, If p is equal to zero, i.e., no periods remain, the alarm task exits. If p is not equal to zero, the carousel drive motor 76 is started, the motor running flag and alarm active flags are set, and the current alarm number is incremented. If the alarm time set for the next alarm number is A.M. 00:00, indicating that no alarms remain for the current day, the current alarm number is set equal to 1, the first alarm within a 24 hour period. The alarm task then exits after resetting the check alarm flag.

MICRO SWITCH TASK(FIG. 14)

FIG. 14 depicts the program flow for positioning the carousel 15. The carousel position is determined by counting contact closures of the lever actuator 79 which is activated by protuberances 75*a* on the carousel. Because the illustrated micro switch 30 is a mechanical device and therefore likely to bounce, a delay is provided to inhibit inspecting the micro switch state until well after all switch bounce has died out. This delay is implemented by advancing a count (delay counter), initially set to zero, until a predetermined terminal count, $N_0=2$, has been reached. This counter is incremented once a second by the timer task. As shown in FIG. 14, if the count $N_0=2$ has not been reached, the micro switch task is exited. Once the count $N_0=2$ is reached, the micro switch scan line is activated to enable microcomputer restart upon subsequent micro switch closure. When the microcomputer determines that the micro switch 30 has closed, the delay counter is reset. Then if the microcomputer is in the carousel indexing mode, k, the number of micro switch closures to index position, is decremented. If k is not equal to zero, i.e., the index position has not been reached, the micro switch task exits with the motor running. When k equals zero, the carousel has reached the index position. The carousel drive motor 76 is stopped, the motor running flag is reset, and the micro switch scan line is reset.

If the microcomputer 27 is not in the carousel indexing mode, then upon detecting a closure of the micro switch 30, the motor 76 is stopped, the motor running flag is reset, and the number of dose periods remaining, p, is decremented. If p equals zero, "0000" is displayed on the LCD 32 and the blink LCD flag is set. This will cause the timer task to flash "0000" on and off to indicate that the dispensing system 11 needs to be reloaded. In addition, the microcomputer 27 prepares to issue the audible signal by setting the speaker flag, minimum alarm flag, five second alarm flag, and the alarm counter to three. The micro switch task also sets the blink LCD flag, resets the micro switch scan line, resets the seconds interval timer and sets the alarm repetition counter to six. The micro switch task then exits.

The speaker flag indicates that the microcomputer 27 is to produce an audible signal on the speaker 48. The minimum alarm flag is used to ensure that an audible alarm of minimum duration will be issued under all circumstances. The five second alarm flag is used to switch between five second alarm periods and ten second silent periods. The number three loaded into the alarm counter determines the number of times the five second alarm/ten second silent cycles will be repeated for an initial alarm.

PUSHBUTTON TASK (FIG. 15)

FIG. 15 shows the program flow for pushbutton tasks, A and B. The microcomputer 27 enters pushbutton task A when the pushbutton 31 is activated. If the minimum alarm flag is not set, indicating that an alarm of minimum duration has occurred, the speaker flag and blink LCD flag are reset and a stop alarm command is issued to cancel the acoustic alarm 33 and the blinking LCD.

Next, the number of dose periods remaining, p, and the number of dose days remaining, d, are displayed and the time display and colon blink are inhibited. In addition, the check alarms flag is set, the alarm active flag is reset, the pushbutton task B flag is set and task A is exited. Upon each clock tick pushbutton task B will be entered. Pushbutton task B checks to see if new values of p and d are entered or if four seconds have elapsed. If no new values are entered, the pushbutton task exits and is re-entered on the next clock tick when it again checks for new values of p and d. This continues for four seconds.

If new values of p and d are entered via the keypad 29, the microcomputer 27 checks the values for validity.

If an entered number is invalid then an audible error indication is given, and the microcomputer waits for a valid number. If the entered values are valid, they are accepted as new values for p and d, and displayed for four seconds before the task is exited and the time display and colon blink are enabled.

Figure 16A:
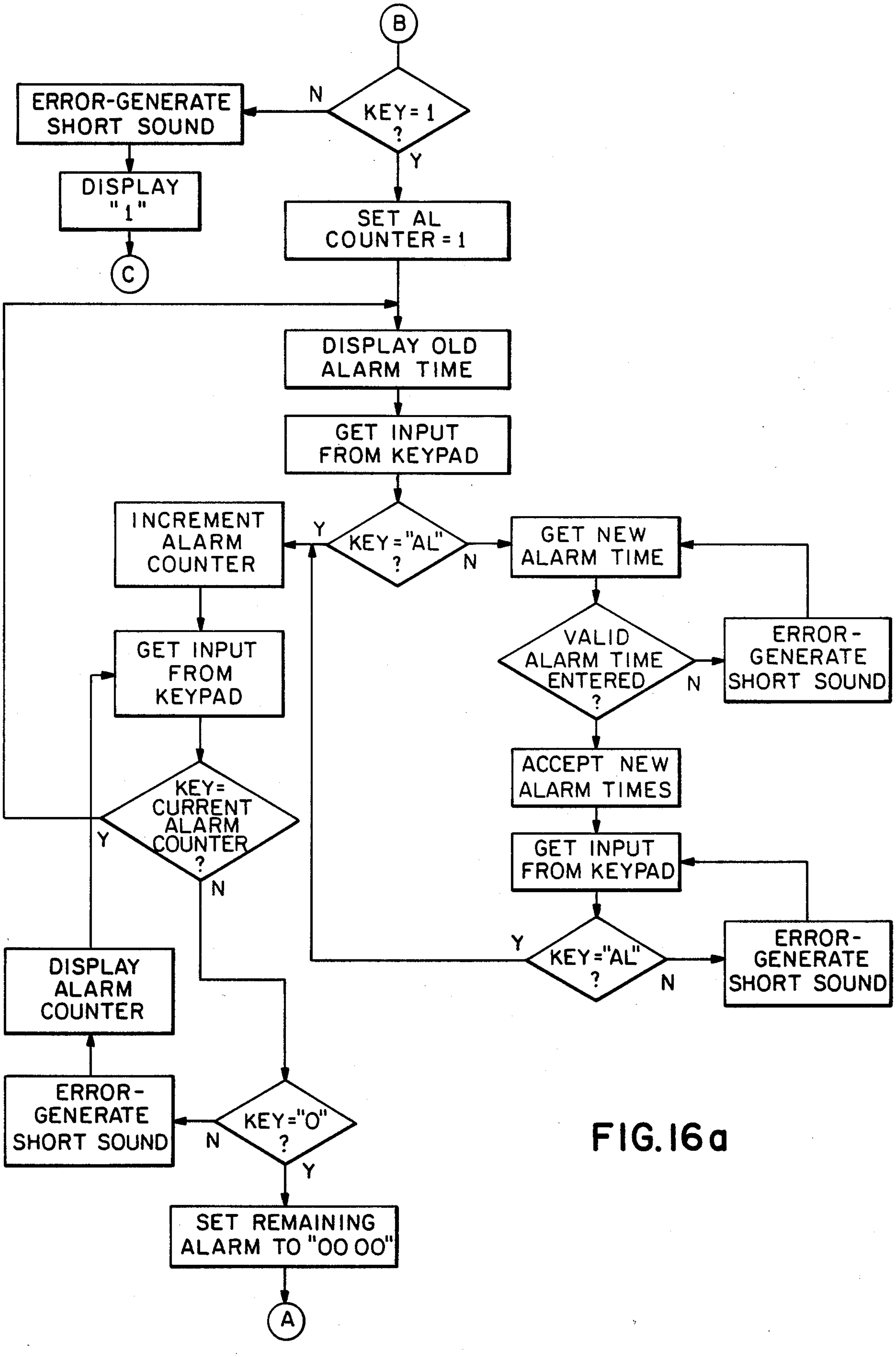

KEYPAD TASKS (FIGS. 16, 16*a*, 16*b*)

FIGS. 16, 16*a* and 16*b* show the program flow for the keypad task. Before the microcomputer 27 enters the idle state, it sets the three keyboard scan lines. This will cause the microcomputer 27 to restart as soon as a key is activated.

When a key on the keypad 29 is activated the microcomputer 27 restarts and enters the keypad task. When this task is entered the colon blink is reset and the time display disabled, and the keypad 29 is scanned to determine which key has been activated. Each time a key is activated the corresponding symbol or number is displayed on the LCD 32. If the first key is a number, "AM" is also displayed. If an invalid number is entered, an audible alarm is given, the number is rejected and the microcomputer waits for a valid entry.

The first time a key is activated, the microcomputer 27 determines if the key on the keypad 29 was "PM", "AL" or a number. If "PM" is the first key pressed, PM is displayed and the microcomputer waits for another key to be depressed. If the next key is a number, the microcomputer enters the set clock time mode and accepts three additional numbers. If the numbers are entered without error, they are accepted as the new clock time hour and minute and the microcomputer enters the display time mode.

If "AL" is the second key pressed after "PM", then the index carousel mode is entered by setting the index carousel flag, starting the motor 76 and setting the motor running flag. The keypad task is exited after enabling time display and colon blink.

If "PM" is the second key pressed after "PM", the operation is cancelled and the keypad task exited with time display and colon blink enabled.

If the first key pressed is a number, a get time mode is entered as described above but the LCD display "AM" instead of "PM" indicator is activated.

If the first key pressed is "AL", AL is displayed and the microcomputer waits for a second key to be pressed. If the second key is "0", the normal audible tone and loudness are set. If the second key pressed is a "9," then the loud output and low tone are set for audible signals. If the second key is "AL", the operation is cancelled. In each of the above cases, the task is exited after enabling clock display and blinking colon.

If the second key is "PM", the get "k" mode is entered and the microcomputer 27 waits for a third key to be activated. If the third key is a "PM", the previous "PM" is cancelled and the microcomputer 27 again waits for the second key after "AL" to be pressed. If the third key is an "AL", an error is signaled and the task exited. If the third key after "AL" and "PM" is a number, the microcomputer waits for a fourth key to be pressed. If the two digits are a valid "k" value, then they are accepted as the "k" value. The index carousel mode is then entered by setting the index flag, starting the carousel drive motor 76 and setting the motor running flag. The keypad task is then exited after enabling clock display and blinking colon.

If, after an "AL" is pressed as the first key and the second key is not "AL", "0", "9" or "PM", the microcomputer enters the set alarm mode. The microcomputer can only accept a "1" for the second key punched which represents an alarm number. If it is not a "1", error is signaled, "1" is displayed on the LCD 32 and the microcomputer 27 waits for another key to be pressed. If a "1" is pressed after "AL" the microcomputer 27 sets the alarm counter to 1 and displays the clock alarm time for alarm 1 (AL1). The microcomputer 27 waits for another key to be pressed. If "AL" is pressed, the old alarm time for AL1 is retained, the alarm counter is incremented and microcomputer 27 waits for another key to be pressed. If the next key pressed is equal to the alarm counter value, in this case "2", then the clock alarm time for that alarm is displayed. If PM or a number is entered instead of AL while the old alarm time is displayed, the microcomputer 27 accepts four or three additional key activations to obtain the new alarm time in hours and minutes. If the new alarm time is valid, it replaces the old alarm time and the microcomputer 27 becomes ready to accept the next alarm time. The process of accepting alarm number inputs, displaying the old alarm time and accepting new alarm times is repeated until "AL", "0" is entered. When "AL", "0" is entered, all remaining alarms are set to AM 00:00 hours and minutes to indicate unused alarms. The alarms must be entered consecutively. If an alarm number is entered out of sequence, the microcomputer 27 displays the expected alarm number and waits for the expected number to be entered.

After the alarm entry is completed, the clock display and colon blink are enabled and the keypad task exited.

Whenever a keypad entry error has been detected, an error is signaled to the speaker task which then generates a short sound.

SPEAKER TASK (FIG. 17)

FIG. 17 shows the program flow for the speaker task. This task is entered when the speaker flag is set. Upon entry, this task inspects the seconds interval timer to determine if the one to two second minimum alarm has been signaled. If so, the minimum alarm flag is reset. Next, the initial alarm counter is inspected to determine if the initial alarm of three five-second tones has been completed. If the initial alarm counter has not been decremented to zero, the speaker task enters the initial alarm mode.

Upon entering the initial alarm mode, the five second flag is checked to determine whether the sound generator 121 should be started. If in the five second state, the low tone flag is tested. If the low tone flag is set, then the sound ROM 143 is set to the low tone program, otherwise the sound ROM is set to the high tone program. The speaker task then enables the sound generator 121 and resets the five second flag. The alarm generator 121 will then independently generate a five second alarm unless cancelled by activation of the pushbutton 31. The alarm task also decrements the initial alarm counter by one. Upon each subsequent entry into the alarm task, the seconds interval is checked to determine if 15 seconds have elapsed since the start of the alarm. If so, the task sets the five second flag and the alarm generation procedure described above is repeated. This process of generating a five second tone, decrementing the initial alarm counter, and pausing for 10 seconds of silence is repeated until the initial alarm counter decrements to zero, indicating the initial alarm has been issued.

The initial alarm will terminate if the user responds by activating the pushbutton 31. Activation of the pushbutton 31 will cause the pushbutton task to reset the speaker flag which will prevent the speaker task from being re-entered.

If the pushbutton 31 is not activated during the initial alarm, the speaker task enters a mode in which it generates a five second tone every 9 minutes. Thus, if the initial alarm counter is zero when the speaker task is entered, the task starts a 9 minute timer. After 9 minutes pass, the task generates a five second tone in the manner described above, resets the 9 minute timer and decrements a repetition counter. If the user fails to respond, this 9 minute cycle will be repeated a maximum of 6 times. After the sixth repetition, the speaker flag is reset, inhibiting further alarms for this dosage period.

The speaker task is also activated whenever an entry error is detected. The task then generates a predetermined short sound.

LOW BATTERY TASK (FIG. 18)

Once each minute the low battery task will be entered to check battery voltage. The battery voltage test is implemented via a special microcomputer test battery instruction. If the battery voltage drops below a predetermined value, the low battery task will blank the time display and set the AM and PM indicators simultaneously to provide a visual warning that the battery needs to be replaced.

OPERATION

In order to ready the dispensing system 11 for operation, the top cover 13 of the dispensing system 11 is removed. Procedural instructions will normally be found printed on the underside of the top cover. PM and AL are punched-in on the keypad 29. The carousel 15 will then rotate until it realigns itself. At this point, zero bin 17 will match the access opening 21. The bins 17 of the tray 16 are normally refilled with tablets and/or capsules 18 according to prescription, when the tray is removed. The tray 16 may be filled in situ, also. Extra trays 16 may be available so that a tray can be readied for immediate substitution into the dispensing system 11.

To reset time, AM is not entered but PM is, when appropriate. If PM is entered by mistake, repunching PM on the keypad 29 will cancel the entry.

Time is always entered as four digits—the first two for hours, and the second two for minutes. If less than 10 hours, a zero is introduced ahead of the hours' digit. If less than 10 minutes, a zero is introduced ahead of the minutes' digit. Numbers larger than 12 for the hour setting and larger than 59 for the minute setting will be rejected and a short sound will be generated to indicate an error. Corrected numbers will have to be repunched. Time will start running immediately after entering fourth digit. Therefore, accuracy will be improved by entering a fourth digit precisely on the minute. A colon between hours and minutes will be flashing, a second on and a second off, to indicate that time is running.

To set the acoustic alarm 33, and the visual alarm, alarms are keyed-in in numerical sequence (AL 1 to AL 8). If by mistake the right sequence is not followed, a sound will be heard, indicating an error and the alarm number that ought to be punched-in will appear in display. The next step is to punch-in AL followed by the alarm number displayed. To start with, AL 1 is keyed-in. Immediately a bell-shaped alarm display sign is exhibited on the LCD 32, followed by the previous alarm setting for AL 1. If the same alarm time is desired, then AL 2 is punched-in next. If not, the desired alarm time for AL 1 is punched-in, and then is followed up with AL 2 and so on until all desired alarm times have been punched-in. Following the setting of all desired alarms, it is necessary to punch-in AL 0. This action will set all unused alarms, if any, to a no-alarm state, and will revert the LCD 32 to a time mode. If AL is punched-in by mistake, repunching AL will cancel it and display will revert back to time.

In order to set number of dose periods (p) and days (d) remaining, the external pushbutton 31 is pressed. The last p and d settings will then be displayed. The following is then keyed-in:

a. $p_0$ which is the total number of bins 17 initially filled with tablets and/or capsules 18, b. It is followed by $d_0$, which is $p_0$ divided by the number of prescribed dose periods per day, in whole numbers (fractions are eliminated). Both $p_0$ and $d_0$ are punched-in as two-digit numbers so that if either one is less than 10, it is to be preceded by a zero. They both range from 01 to 28. The microcomputer 27 will not accept numbers larger than 28. If an unacceptable number is introduced, it will make a sound, indicating an error. A wrong number will be rejected so that correct number will have to be entered.

Display will revert back to time four seconds after the last digit has been punched-in. In the event of an error, the numbers can be repunched after all four digits have been displayed. Or, if the LCD 32 has reverted back to time, the pushbutton 31 needs to be activated again before repunching. Any change in the number, frequency or variety of dose intake requires a new loading and a program reset.

For purposes of setting the acoustic alarm 33 tone and volume, AL 0 is punched-in for normal tone and loudness, e.g., 2040 Hz. AL-9 is punched-in for loud output low frequency, e.g., 500 Hz tone (to be used when high tone hearing is limited).

To reset or refill and reset the dispensing system 11 after a power interruption, the top cover 13 is removed. If battery 59 is to be replaced, the insert 58 has to be removed and this can be simply unscrewed by means of a coin.

After power is restored, a number k stamped around the outer wall of the base unit 12 corresponding to zero bin 17 of the tray 16 is entered as AL, PM, k. k is punched-in preceded by a zero, if necessary, to make it a two-digit number, such as AL, PM, 05. This action will take the carousel 15 to the starting position. No activity occurs when the number entered for k is in excess of 28.

In operation, precisely at the onset of an alarm time, motor 76 will start running, moving the carousel 15 a one-bin interval in about four seconds, being stopped by the closure of the micro switch 30 by the lever actuator 79 riding upon a protuberance 75*a* at an interval of exactly one-bin width. The acoustic alarm 33 will then be triggered, sounding off and the LCD 32 time mode will blink. The acoustic alarm 33 will go on for five seconds and off for ten seconds, three times in a row, while the LCD 32 continuously blinks. At the same time, p will be decreased by one and the microcomputer 27 will keep tab of $k=29-p_0+p$, thereby subtracting from 29 the number of closure signals generated by the micro switch 30. Both updated p and k will be stored in the data memory 135.

Pushbutton 31, if manually depressed, will stop the acoustic alarm 33 and the blinking of the LCD 32, and make the LCD 32 exhibit updated p and d values for four seconds. There is a minimum alarm requirement of one to two seconds to avoid a "no-alarm" possibility when by coincidence pushbutton 31 is pressed at the same time that the alarm is initiated. The dose can now be retrieved by raising the access window 41 and temporarily turning the dispensing system 11 over.

If after 9 minutes, the acoustic alarm 33 and LCD 32 blinking is still not deactivated, the sound will go on again for 5 seconds and off for 9 minutes. This cycle will repeat as long as the acoustic alarms remain activated and time has not extended beyond 59 minutes. After 59 minutes, the acoustic alarm 33 and LCD 32 blinking will deactivate.

d will be degraded by one at midnight of each day and stored in the data memory 135.

All future motor 76 activity will be eliminated when p reaches zero. The LCD 32 will now exhibit a blinking 00 00.

p and d can be inquired at any time by depressing the pushbutton 31. Then, p and d will be displayed for 4 seconds after which the LCD 32 will revert back to time, or to flashing 00 00, if p=0.

When PM AL is keyed-in, a signal from the microcomputer 27 will start motor running and keep it running until the number of closures of the micro switch 30 equals k. One exception is when $p=p_0$ and no activity ensues then.

If time display in the LCD 32 is blanked, and AM and PM indicators are simultaneously displayed, it is a visual warning that the battery 59 needs to be replaced within a few days.

What is claimed is:

1. A dispensing system comprising a base unit having a top cover and a bottom cover, the top cover having an access opening therein, a rotatable carousel in said base unit, said carousel comprising a vertically extending, circular wall connected to an outwardly extending ring at its lower end, said circular wall having vertically extending, spaced protuberances extending inwardly from its inner surface, a tray in said carousel having a plurality of bins therein, said tray comprising a pair of circular radially spaced walls providing a circular opening proportioned to surround said circular wall on said carousel, connecting means between said carousel and said tray, a drive means connected to said carousel, a processor for actuating said drive means and including a microcomputer, switch means connected to said processor and positioned to be actuated by said protuberances and an alarm connected to said microcomputer.

2. A dispensing system in accordance with claim 1 wherein said tray is removable from said carousel.

3. A dispensing system in accordance with claim 1 wherein said alarm comprises a visual alarm and an acoustic alarm.

4. A dispensing system in accordance with claim 1 further including an LCD connected to said microcomputer and serving as a visual alarm.

5. A dispensing system in accordance with claim 1 further including an LCD connected to said microcomputer and serving as a visual alarm, time indicator, keypad entry indicator and low battery voltage indicator.

6. A dispensing system in accordance with claim 1 further including an access window for covering said access opening.

7. A dispensing system in accordance with claim 1, said switch means comprising a micro switch, said micro switch being actuated by said protuberances and providing input to said microcomputer.

8. A dispensing system in accordance with claim 1, said processor further including a keypad connected to said microcomputer.

9. A dispensing system in accordance with claim 1 wherein said carousel includes a circumferentially disposed gear which engages said drive means, and said switch means comprises a micro switch having a toggle which is positioned to engage said protuberances and which provides input to said microcomputer.

10. A dispensing system in accordance with claim 1 wherein said base unit comprises a bracket disposed below said top cover which carries a keypad connected to said microcomputer, said keypad being positioned for access upon removal of said top cover.

11. A dispensing system in accordance with claim 1 wherein said microcomputer includes a control unit, program memory, arithmetic logic unit, data memory, timer, LCD driver and controller, input port, output register, sound generator and low battery voltage indicator.

12. A dispensing system in accordance with claim 8 wherein said sound generator outputs different frequencies and volumes.

13. A dispensing system in accordance with claim 4 wherein said processor further includes a pushbutton connected to said alarm and to said microcomputer whereby said alarm may be stopped and said LCD may display the number of dose periods and dose days remaining.

14. A dispensing system in accordance with claim 1 wherein said processor causes said carousel to move a bin under said access opening at a predetermined time and actuate said alarm.

15. A dispensing system in accordance with claim 1 wherein said access opening is of like size to the size of a bin.

16. A dispensing system in accordance with claim 1 wherein said microcomputer holds in RAM the number of available doses and the number of dose days remaining and decrements said available dose number after each alarm by one and also decrements the number of dose days each day.

17. A dispensing system in accordance with claim 15 wherein said microcomputer outputs a signal when reload of said tray is necessary.

18. A dispensing system in accordance with claim 2 wherein the connecting means includes keying means between said carousel and said removable tray.

* * * * *